Feb. 12, 1952     F. E. JOHNSON     2,585,897
SNAP FASTENER
Filed Oct. 25, 1947
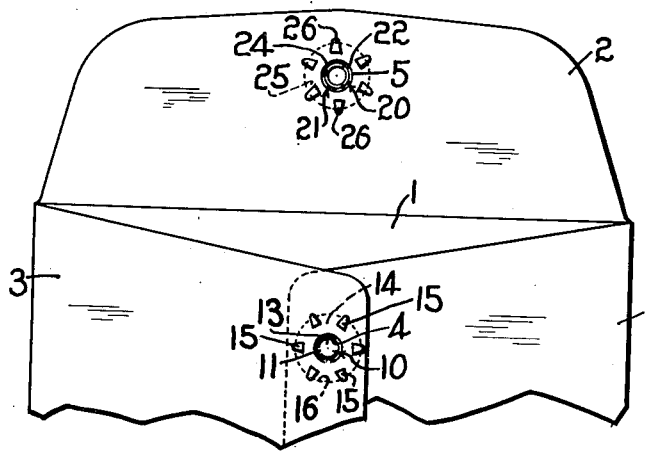
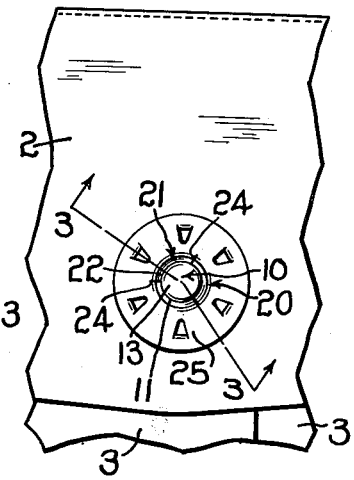
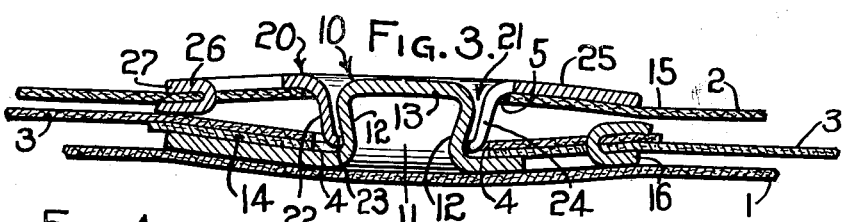
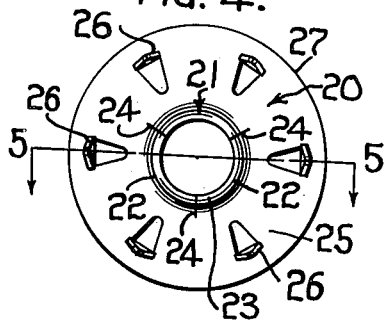
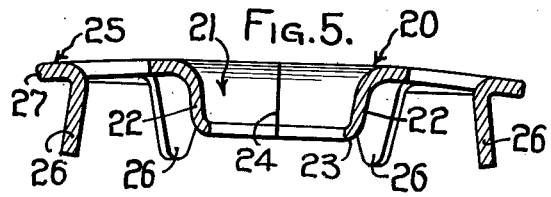
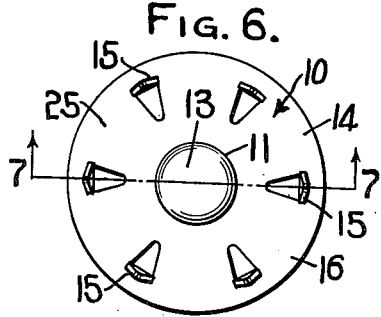
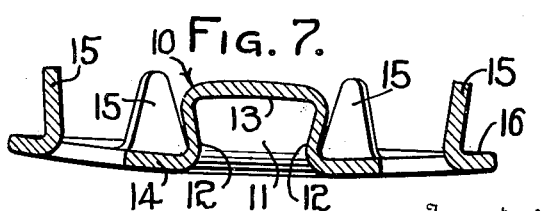
Inventor:
FRANK E JOHNSON
By Philip E. Parker
Attorney Patented Feb. 12, 1952

2,585,897

UNITED STATES PATENT OFFICE 2,585,897

SNAP FASTENER

Frank E. Johnson, Malden, Mass., assignor to United-Carr Fastener Corporation, Cambridge, Mass., a corporation of Massachusetts Application October 25, 1947, Serial No. 782,166

3 Claims. (Cl. 24—217)

The present invention relates to fasteners, and more particularly to fasteners for securing the flap of paper, cardboard and the like envelopes to the body thereof, and aims generally to improve existing fasteners of that type.

An object of the invention is the provision of a cooperating stud and socket fastener that is extremely simple in construction and economical of manufacture.

A further object of the invention is the provision of improved stud and socket fastener members, each of one-piece construction, suitable for use as an envelope fastener and which may be of thin sheet metal construction to facilitate the feeding of envelopes from a stack or pile, as for example in an addressing or manifolding machine.

A still further object is the provision of improved stud and socket fastener members of one-piece construction having improved means for attachment to a paper or like sheet and wherein tendency of the sheet to be sheared around the fastener is minimized.

Other aims and advantages of the invention will be apparent to persons skilled in the art from a consideration of the accompanying drawings and annexed specification illustrating and describing a preferred construction embodying the invention.

In the drawings:

Fig. 1 is a plan view of a portion of a paper or like envelope illustrating the improved fastener parts applied to the flap and body portion of the envelope;

Fig. 2 is an enlarged plan view of a portion of the envelope illustrating the fastener in closed or fastener position;

Fig. 3 is an enlarged vertical sectional view as taken on the line 3—3 of Fig. 2;

Fig. 4 is an enlarged plan view of the socket fastener member;

Fig. 5 is a vertical sectional view of the socket fastener member as taken on the line 5—5 of Fig. 4;

Fig. 6 is an enlarged plan view of the stud fastener member; and

Fig. 7 is a vertical sectional view of the stud fastener member as taken on the line 7—7 of Fig. 6.

The invention comprises cooperating stud and socket fastener members, each of one-piece construction, and each having a dished or concaved base and tubular fastener portion extending substantially normal thereto from the concaved face thereof. The base of each member is provided with integral attaching means, preferably in the form of pointed prongs, joined to the base inwardly of the peripheral edge thereof and extending inwardly from the concaved face thereof, said prongs being adapted to be bent outwardly in engagement with an opposed face of a paper or like sheet and being of a length to extend beyond the peripheral edge of the base.

The fastener is particularly adapted for use as an envelope or like fastener, and is illustrated as applied to a paper or like envelope having a front 1, a flap 2 and back sections 3 which may be overlapped and adhesively secured along the center line as is usual with many styles of envelopes. The overlapped edges of the back section 3 may be apertured as at 4 to receive the stud of a stud fastener member 10 and the flap 2 may be apertured as at 5 to receive the tubular socket of a socket fastener part 20. However, the stud of the stud fastener member 10 may be used to punch the aperture at 4 when it is affixed to the back section 3 and also the tubular socket of the socket fastener part 20 may be used to punch the aperture at 5 when it is affixed to the flap 2.

Referring to the drawings, the stud fastener member 10 is a thin dished or concaved sheet metal body, preferably of circular shape, and provided with an integral central hollow tubular stud 11 having divergent side walls 12 and an enlarged closed head 13. The portion of the body surrounding the stud provides a concaved or dished collar or flange 14 adapted for bearing engagement with one face of a paper or like sheet, for example, the inner face of one of the overlapped back sections 3 of the envelope.

The stud collar or flange 14 is provided with a plurality of attaching prongs 15 extending outwardly from the concaved face thereof, and preferably these are arranged in a circular series as shown in Fig. 6. Preferably the prongs 15 are cut from the body of the flange 14 and are joined thereto inwardly of the peripheral edge of the flange so as to provide a continuous peripheral material-engaging rim 16. The prongs 15 extend outwardly from the concaved face of the flange and are normally divergent to the axis of the tubular stud 11, so that when subjected to pressure, will be flattened outwardly toward the peripheral edge of the flange opposite the rim 16. Preferably, the prongs 15 are of sufficient length so that their terminal ends will be radially outwardly of the peripheral edge of the flange 14.

The socket member 20 may be formed of a thin dished or concaved sheet metal body, preferably of circular shape and provided with an integral tubular socket barrel 21 extending outwardly from the concave face of the body and having convergent sides 22 terminating in an inturned edge 23 defining a stud-receiving opening. The sides 22 of the tubular socket 21 may be slit as at 24 and spaced at circumferential points, the slits extending from the edge 23 inwardly toward the base of the socket to provide sufficient resilience in the socket for snap fastener engagement with the rigid stud 11. The body flange 25 surrounding the tubular socket 21 may be concaved, similar to the stud, and provided with a circular series of tapered attaching prongs 26 integrally joined to the socket flange 25 inwardly of the peripheral edge to provide a continuous peripheral material-engaging rim 27. As in the case of the attaching prongs of the stud member, the socket prongs are adapted to penetrate the supporting material inwardly of the peripheral edge of the socket base and to be bent outwardly in spaced relation with the peripheral rim 27 and forced into clenched engagement with the supporting material 2.

As will be apparent from Fig. 3, the fasteners, when inter-engaged, present convexed members tapering toward the peripheral edges thereof which when used as envelope fasteners facilitate the stacking and feeding of the envelopes in addressing and manifolding machines with a minimum of sticking due to engagement of the fastener with a part of the machine or with an edge of another envelope. Additionally, the particular arrangement of attaching prongs has many advantages over prior attaching prongs joined to the peripheral edge of the base, in that the point of penetration of the supporting material is spaced from the peripheral edge of the fastener base, which is the line of shear in paper and like supporting materials, resulting in a much improved and stronger attachment of the fastener to the support.

Although I have illustrated and described one embodiment of the invention, I do not intend to be restricted to the details thereof as the scope of the invention is best defined in the appended claims.

I claim:

1. A snap fastener comprising cooperating stud and socket members each formed of a single piece of sheet material and having a base and an integral concentric tubular fastener element extending substantially normal thereto, the base of said stud and socket members being dished toward their respective tubular fastener element so as to be opposed in convexed relation when assembled in fastening engagement, and attaching prongs on said bases for attaching the fastener elements to a support.

2. A snap fastener comprising cooperating stud and socket members each formed of a single piece of sheet material and having a base and an integral concentric tubular fastener element extending substantially normal thereto, the base of said stud and socket members being dished toward their respective tubular fastener element so as to be opposed in convexed relation when assembled in fastening engagement, said bases provided with attaching prongs formed from within the body thereof and joined thereto radially inwardly from the peripheral edge thereof.

3. A snap fastener comprising cooperating stud and socket fastener members adapted to be attached to two pieces of fragile material such as paper, each of said members being formed of a single piece of thin sheet material and having a flanged base of relatively large area adapted to seat a piece of paper thereagainst and an angularly extending tubular fastener part disposed substantially normal to the base, a plurality of attaching prongs extending outwardly from said bases inwardly of the peripheral edge portions thereof and on the same sides as said tubular fastener parts, said attaching prongs being adapted to be bent outwardly to clamp fragile material against the inner sides of said bases whereby when such stud and socket are engaged such fragile material is disposed between the bases thereof so that a pull thereon to separate said stud and socket will exert pressure on said bases rather than on the prongs thereby preventing tearing of such fragile material.

FRANK E. JOHNSON.

REFERENCES CITED

The following references are of record in the file of this patent:

UNITED STATES PATENTS

| Number | Name | Date |
| --- | --- | --- |
| 479,975 | Denis | Aug. 2, 1892 |
| 890,608 | Cliff | June 16, 1908 |
| 1,451,612 | Hausner | Apr. 10, 1923 |
| 2,385,880 | Peterson | Oct. 2, 1945 |

FOREIGN PATENTS

| Number | Country | Date |
| --- | --- | --- |
| 400,870 | France | June 26, 1909 |